United States Patent [19]

Nishiyama

[11] 4,294,322
[45] Oct. 13, 1981

[54] ELECTRONIC WEIGHT MEASURING DEVICE

[75] Inventor: Yoshihisa Nishiyama, Shizuoka, Japan

[73] Assignee: Tokyo Electric Co., Ltd., Tokyo, Japan

[21] Appl. No.: 148,499

[22] Filed: May 9, 1980

[30] Foreign Application Priority Data

May 15, 1979 [JP] Japan .................................. 59-489

[51] Int. Cl.³ .............................................. G01G 3/14
[52] U.S. Cl. ......................... 177/210 R; 177/210 FP; 177/211; 177/DIG. 3
[58] Field of Search ............. 177/210 R, 210 FP, 211, 177/DIG. 3

[56] References Cited

U.S. PATENT DOCUMENTS

| | | | |
|---|---|---|---|
| 4,081,801 | 3/1978 | Thomas et al. | 177/DIG. 3 |
| 4,158,396 | 6/1979 | Suzuki et al. | 177/210 R |
| 4,238,784 | 12/1980 | Keen et al. | 177/DIG. 3 |

*Primary Examiner*—George H. Miller, Jr.
*Attorney, Agent, or Firm*—Frishauf, Holtz, Goodman & Woodward

[57] ABSTRACT

An electronic weight measuring device includes a load cell producing an output voltage varying from $-V_X$ to 0 volts according to the weight of load, a bias circuit producing a variable bias voltage $V_X$, voltage generator receiving the output voltages from the load cell and bias circuit and producing an output voltage varying within a range from $-\frac{1}{2} V_X$ to $+\frac{1}{2} V_X$, and an analog-digital converter for converting the output voltage from the voltage generator. The electronic weight measuring device further includes a zero point setting circuit coupled to the load cell and bias circuit and applying an output voltage varying with the output voltage from the bias circuit to the load cell, so that the no-load output voltage of the load cell is kept at substantially 0 volts.

11 Claims, 4 Drawing Figures

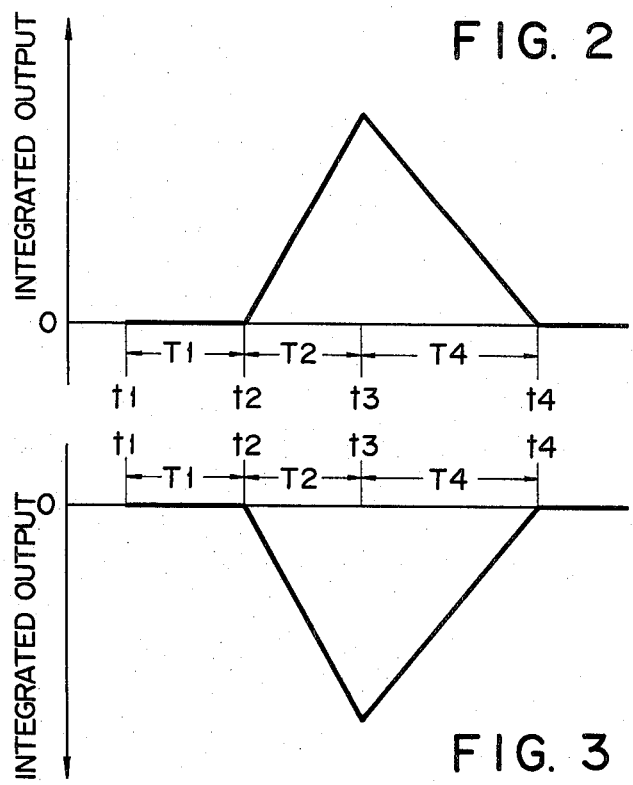
FIG. 2
FIG. 3
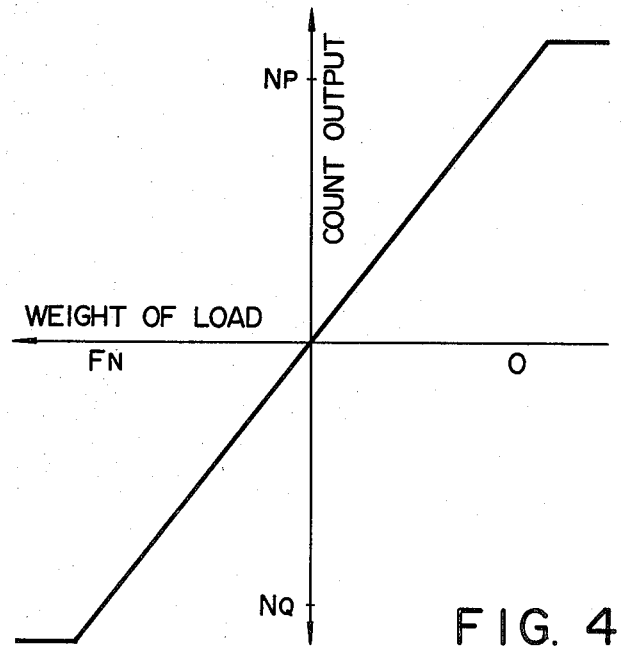
FIG. 4

ELECTRONIC WEIGHT MEASURING DEVICE

BACKGROUND OF THE INVENTION

This invention relates to an electronic weight measuring device with a load cell.

Conventionally, there are known electronic weight measuring devices which are provided with a load cell to produce output signals corresponding to weight and an analog-digital (A/D) converter for converting the output signals from the load cell into digital signals. In one such electronic weight measuring device, the load cell produces a unipolar, e.g. negative voltage signal corresponding to a weight, and the A/D converter produces a digital output signal corresponding to the negative output voltage from the load cell. The digital output signal from the A/D converter is processed by a digital microprocessor, and then supplied to a display unit. Thus, in the prior art electronic weight measuring device, the load cell supplies the A/D converter with a negative output voltage within a range corresponding to a given weight measuring range, so that the A/D converter need be so designed that any input voltage varying within the range corresponding to the weight measuring range may be produced.

In order to eliminate such problem, there is used a zero point setting circuit producing an output voltage with a polarity, e.g. positive, opposite to that of the output voltage from the load cell. The output voltages from the zero point setting circuit and load cell are added, and an addition output voltage is supplied to an A/D converter capable of processing positive and negative input signals. For example, the load cell may be so constructed that the output voltage of the load cell is at zero level when no load is supplied thereto and at $-V_L$ level when the maximum rated load is applied thereto, and the output voltage of the zero point setting circuit may be set at $+\frac{1}{2}V_L$ so that the A/D converter circuit may be supplied with an input voltage ranging from $-\frac{1}{2}V_L$ to $+\frac{1}{2}V_L$. Hereupon, the A/D converter circuit includes an absolute value generator section to produce an output signal corresponding to the absolute value of an input voltage, and an A/D converter section to process an output signal from the absolute value generator section. Accordingly, an A/D converter capable of processing input voltages ranging from 0 to $\frac{1}{2}V_L$ can be used for the A/D converter section. Thus, such device has an advantage over the conventional device because the A/D converter circuit can process an input voltage with a level twice that of a permissible maximum input voltage to the A/D converter section.

The electronic weight measuring device of this type, including an A/D converter circuit for converting bipolar input voltages into digital signals, requires a sensitivity regulator circuit for changing the level of the output signal from the absolute value generator section to regulate the sensitivity of the A/D converter section. Suppose, for example, a case where the A/D converter section is adjusted to produce an output signal for a count of 20,000 when no load is applied and to produce an output signal for a count of $-20,000$ when the maximum allowable weight is applied. In this case, it is possible first to regulate the zero setting circuit in a no-load state so that the output signal from the A/D converter section may correspond to the count of 20,000, and then to adjust the sensitivity regulator circuit so that the A/D converter section may produce an output signal corresponding to the count of $-20,000$, thereby representing the range of weight measured between no-load and maximum allowable load states by a count of 40,000. However, although the adjustment of the sensitivity of the A/D converter section by means of the sensitivity regulator circuit causes such sensitivity to vary from the sensitivity obtained when the zero point regulator circuit is adjusted, the no-load input level of the A/D converter section, fixed by the zero point regulator circuit, will never change, so that the no-load count output of the A/D converter section will possibly change after completion of the adjustment. Accordingly, in order to obtain a count difference of 40,000 between the no-load and maximum allowable load states, the zero point regulator circuit and sensitivity regulator circuit need be adjusted repeatedly.

An object of this invention is to provide an electronic weight measuring device with an A/D converter capable of easily performing sensitivity regulation.

SUMMARY OF THE INVENTION

According to an embodiment of this invention, there is provided an electronic weight measuring device which comprises a load cell producing between first and second output terminals an output voltage signal corresponding to a weight of load within a given weight measuring range, a signal processing circuit producing an output signal corresponding to the output signal from the load cell, bias means applying bias voltage to the signal processing circuit to set the range of variation in the output signal of the signal processing circuit to a range corresponding to the given weight measuring range and defined by positive and negative values, analog-digital converter means for converting the output signal from the signal processing circuit into a digital signal, a weight indicating signal generator circuit producing in response to a digital output signal from the analog-digital converter means an output signal representing a weight to be measured, and a zero point setting circuit coupled to the bias means and applying control voltage to one of the first and second output terminals of the load cell to set the output signal of the load cell to substantially 0 volts when no load is applied to the load cell.

BRIEF DESCRIPTION OF THE DRAWINGS

FIGS. 2 and 3 illustrate the operation of an integrator used with the electronic weight measuring device of FIG. 1; and FIG. 4 shows the relationship between the count output of a counter used with the electronic weight measuring device of FIG. 1 and the weight of load.

DETAILED DESCRIPTION

Figure 1:
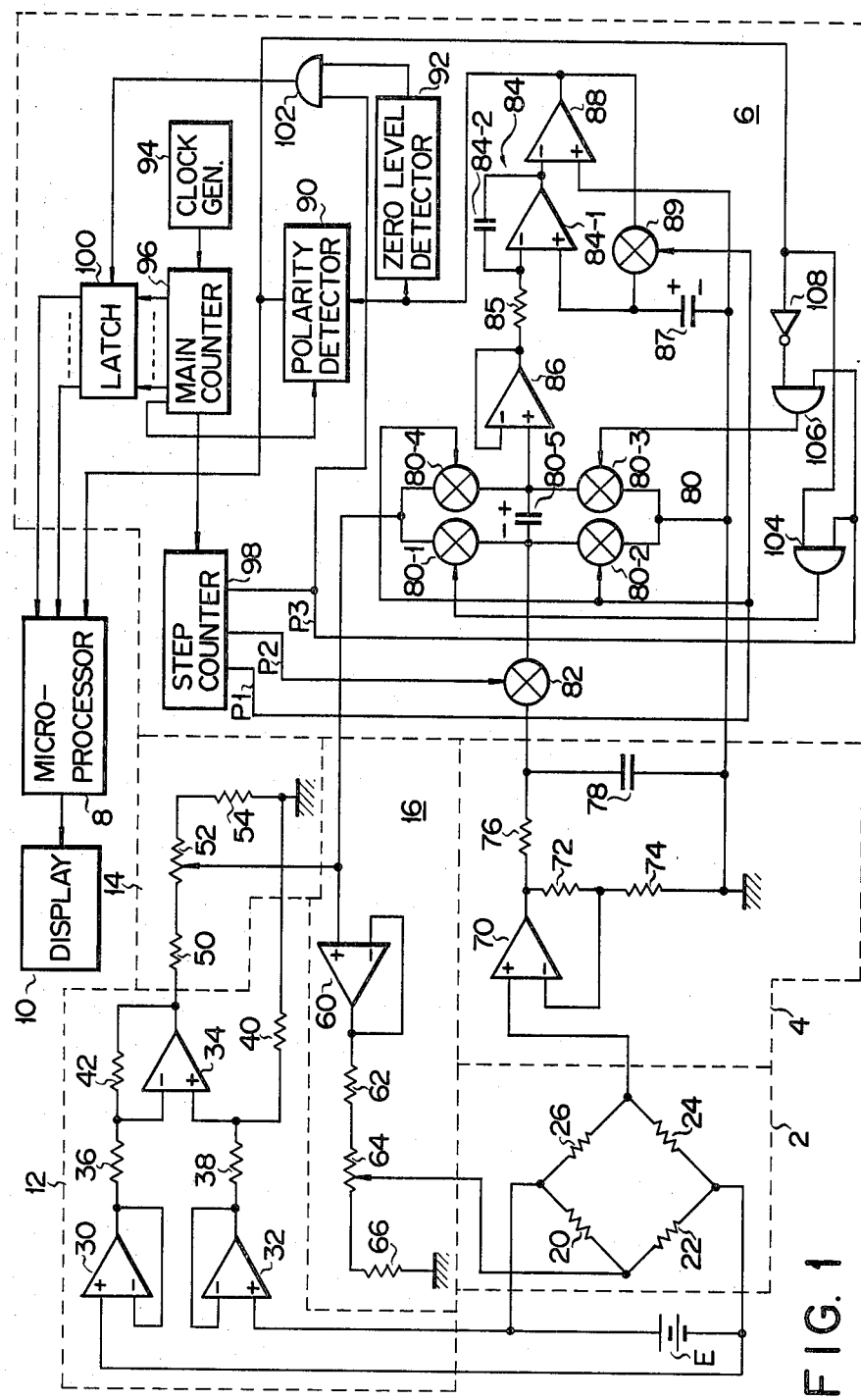
FIG. 1 is a circuit diagram of an electronic weight measuring device according to an embodiment of this invention.

FIG. 1 shows an electronic weight measuring device including a battery power source E, a load cell 2 coupled to the battery E and producing an output voltage signal corresponding to the weight of a load, an amplifier circuit 4 for amplifying the output voltage signal from the load cell 2, an analog-digital (A/D) converter circuit 6 for converting an output signal from the amplifier circuit 4 into a digital signal, and a microprocessor 8 processing the digital signal from the A/D converter circuit 6 and supplying a display unit 10 with weight data corresponding to the weight of load. The electronic weight measuring device further includes a reference voltage signal generator circuit 12 coupled to the battery E and producing a reference voltage signal, a sensitivity regulator circuit 14 coupled to the reference voltage signal generator circuit 12 and supplying a variable output voltage signal to the A/D converter circuit 6 to regulate the sensitivity thereof, and a reference level regulator circuit 16 coupled to the sensitivity regulator circuit 14 and supplying a variable output voltage signal to the load cell 2 to regulate the reference level of the output voltage signal thereof.

The load cell 2 is formed of four resistors 20, 22, 24 and 26 which constitute a bridge circuit with input terminals coupled across the battery E. As is generally known, these resistors 20, 22, 24 and 26 have resistances varying with the weight of load put on a load bearer (not shown). For example, the load cell 2 is so constructed that the resistances of the resistors 20 and 24 decrease and those of the resistors 22 and 26 increase according to the load. As a result, an output voltage varying with the load is produced between first and second output terminals of the load cell 2, that is, between the junction of the resistors 20 and 22 and the junction of the resistors 24 and 26. If the rated load, actual load, sensitivity, and the output voltage of the battery E are $F_N$, $F$, $K$ and $V_E$ respectively, for example, output voltage V1 of the load cell 2 is given by the following equation;

$$-V1 = -\frac{F}{F_N} \cdot K \cdot V_E \qquad (1)$$

The reference voltage signal generator circuit 12 includes an operational amplifier 30 whose noninverted input terminal is coupled to the negative terminal of the battery E and whose output terminal and inverted input terminal are coupled with each other, an operational amplifier 32 whose noninverted input terminal is coupled to the positive terminal of the battery E and whose output terminal and inverted input terminal are coupled with each other, and an operational amplifier 34 whose inverted input terminal is coupled to the output terminal of the operational amplifier 30 through a resistor 36 and whose noninverted input terminal is coupled to the output terminal of the operational amplifier 32 through a resistor 38 and grounded through a resistor 40. The output terminal and noninverted terminal of the operational amplifier 34 are coupled with each other through a resistor 42. If the resistance of each of the resistors 36 and 38 is R1 and the resistance of each of the resistors 40 and 42 is R2, output voltage V2 of the operational amplifier 34 is given by the following equation:

$$V2 = \frac{R2}{R1} \cdot V_E \qquad (2)$$

The sensitivity regulator circuit 14 is formed of a series circuit of a resistor 50, a potentiometer 52 and a resistor 54 connected between the output terminal of the operational amplifier 34 and ground. If the resistances of the resistors 50 and 54 and R3 and R4 respectively, and resistances of portions between the sliding terminal of the potentiometer 52 and the resistors 50 and 54 are VR3 and VR4 respectively, then voltage V3 between the sliding terminal of the potentiometer 52 and the ground is given as follows:

$$V3 = \frac{R4 + VR4}{R3 + R4 + (VR3 + VR4)} \cdot V2 \qquad (3)$$
$$= \frac{R4 + VR4}{R3 + R4 + (VR3 + VR4)} \cdot \frac{R2}{R1} \cdot V_E$$

The reference level regulator circuit 16 includes an operational amplifier 60 with high output impedance whose noninverted input terminal is coupled to the sliding terminal of the potentiometer 52 and whose output terminal and inverted input terminal are coupled with each other, and a series circuit of a resistor 62, a potentiometer 64, and a resistor 66 connected between the output terminal of the operational amplifier 60 and the ground. The sliding terminal of the potentiometer 64 is connected to the first output terminal of the load cell 2, that is, the junction of the resistors 20 and 22. If the resistances of the resistors 62 and 66 are R5 and R6 respectively, and resistances of portions between the sliding terminal of the potentiometer 64 and the resistors 62 and 66 are VR5 and VR6 respectively, voltage V4 between the sliding terminal of the potentiometer 64 and the ground is given by the following equation:

$$V4 = \frac{R6 + VR6}{R5 + R6 + (VR5 + VR6)} \cdot V3 \qquad (4)$$
$$= \frac{R6 + VR6}{R5 + R6 + (VR5 + VR6)} \cdot$$
$$\frac{R4 + VR4}{R3 + R4 + (VR3 + VR4)} \cdot \frac{R2}{R1} \cdot V_E$$

The amplifier circuit 4 includes an operational amplifier 70 whose noninverted input terminal is coupled to the second output terminal of the load cell 2, that is, the junction of the resistors 24 and 26. The output terminal of the operational amplifier 70 is grounded through a resistor 76 and a capacitor 78 as well as through resistors 72 and 74. The junction of the resistors 72 and 74 is coupled to the inverted input terminal of the operational amplifier 70. Voltage V5 applied between the noninverted input terminal and the ground is given as follows:

$$V5 = (-V1) + V4 \qquad (5)$$

If the resistances of the resistors 72 and 74 are R7 and R8 respectively, output voltage V6 produced from the operational amplifier 70 connected to amplify the input voltage V4 is given as follows:

$$V6 = \left(1 + \frac{R7}{R8}\right)(-V1 + V4) \qquad (6)$$

The A/D converter circuit 6 includes a reference voltage generator 80 with an input terminal coupled to the junction of the resistor 76 and capacitor 78 through a switch 82. The reference voltage generator 80 includes a bridge circuit formed of four analog switches 80-1, to 80-4, and a capacitor 80-5 with one end coupled to the junction of the switches 80-1 and 80-2 and the other end coupled to the junction of the switches 80-3 and 80-4. The junction of the switches 80-1 and 80-4 is coupled to the sliding terminal of the potentiometer 52 of the sensitivity regulator circuit 14, while the junction of the switches 80-2 and 80-3 is grounded. The combination of the amplifier circuit 4, analog switches 80-1 to 80-4, switch 82 and capacitor 80-5 comprises a signal processor circuit. Further, the junction of the switches 80-3 and 80-4 is coupled to an integrator 84 through an operational amplifier 86 and a resistor 85. The integrator 84 includes an operational amplifier 84-1 whose inverted input terminal is coupled to the output terminal of the operational amplifier 86 and whose noninverted input terminal is grounded through a capacitor 87, and a capacitor 84-2 coupled between the output terminal and inverted input terminal of the operational amplifier 84-1. An output signal of the integrator 84 is supplied to the inverted input terminal of an operational amplifier 88 whose output terminal is coupled to the noninverted input terminal of the operational amplifier 84-1 through an analog switch 89 and whose noninverted input terminal is grounded. The output terminal of the operational amplifier 88 is further coupled to a polarity detector 90 and a zero level detector 92.

The A/D converter circuit 6 further includes a clock pulse generator 94 producing a clock pulse signal of e.g. 100 KHz and a main counter 96 for counting clock pulses from the clock pulse generator 94. For example, the main counter 96 supplies one pulse to a step counter 98 with every count of 10,000, and is reset with every count of 40,000, and thereafter starts counting again. In response to output pulses from the main counter 96, the step counter 98 produces pulse signals P1, P2 and P3 while the content of the main counter 96 is indicating, for example, counts ranging from 0 to 9,999, from 10,000 to 19,999, and from 20,000 to 40,000, respectively. The pulse signal P1 is supplied to the analog switches 80-2, 80-4 and 89, while the pulse signal P2 is supplied to the analog switch 82. Further, the main counter 96 supplies an excitation pulse to the polarity detector 90 immediately before it counts 20,000, for example, when it has counted 19,500th pulse. In response to the excitation pulse from the main counter 96, the polarity detector 90 identifies the polarity of an output signal from the operational amplifier 88, and produces a highlevel output signal when the output signal of the operational amplifier 88 is positive or zero, that is, when the output signal of the integrator 84 is negative or zero. The main counter 96 is coupled also to a latch circuit 100. When it is detected by the zero level detector 92 that the output signal from the operational amplifier 88 is reduced to zero level, the latch circuit stores the count value in the main counter 96 in response to a pulse produced by the zero level detector 92 and supplied through an AND gate 102 which receives the pulse P3 at one input terminal thereof. Information stored in the latch circuit 100 and the output signal of the polarity detector 90 are supplied to the microprocessor 8, where they are processed by the well-known method. The microprocessor 8 supplies the display unit 10 with weight data corresponding to an input signal, and displays the weight data on the display unit 10.

The output signal of the polarity detector 90 is supplied directly to one input terminal of an AND gate 104 and is also supplied to one input terminal of an AND gate 106 through an inverter 108. The other input terminals of the AND gates 104 and 106 are supplied with the pulse signal P3 from the step counter 98.

Referring now to FIGS. 2 to 4, there will be described the operation of the electronic weight measuring device shown in FIG. 1.

When the count value in the main counter 96 becomes 0, the pulse signal P1 is produced from the step counter 98, and the analog switches 80-2, 80-4 and 89 are closed. As a result, the capacitors 80-5 and 87 are charged with the output voltage V3 of the sensitivity regulator circuit 14. Since the switch 89 is closed, differential input voltage to the integrator 84 is always zero, and the integrator 84 is kept from executing integrating operation. This state is maintained while the content of the main counter 96 is between 0 and 9.999, that is, while the pulse signal P1 is being produced from the step counter 98 during a period T1. Then, when the content of the main counter 96 is between 10,000 and 19,999, that is, while the pulse signal P2 is being produced from the step counter 98 during a period T2, the analog switches 80-2, 80-4 and 89 are opened, and the analog switch 82 is closed. As a result, the output voltage V6 of the amplifier circuit 4 is applied to the reference voltage generator 80. Hereupon, if the gain of the operational amplifier 86 is "1", an output voltage (V6+V3) is produced from the operational amplifier 86, and supplied to the inverted input terminal of the operational amplifier 84-1 of the integrator 84. At the same time, the capacitor 87 is charged with the voltage V3, and this charging voltage is supplied to the noninverted input terminal of the operational amplifier 84-1, so that the integrator 84 produces an output voltage corresponding to the output voltage V6 from the amplifier circuit 4. The integrated output signal from the integrator 84 is supplied through the operational amplifier 88 to the polarity detector 90, where the polarity of the integrated output signal is identified. That is, as is evident from eq. (6), if the absolute value $|-V1|$ of the output voltage of the load cell 2 is higher than the zero point setting voltage V4, the polarity of the integrated output signal is negative, and a high-level signal is produced from the polarity detector 90. If $|-V1|$ is lower than V4, on the other hand, the polarity of the integrated output signal is positive, and a low-level signal is produced from the polarity detector 90.

When the content of the main counter 96 is between 20,000 and 40,000, that is, while the pulse signal P3 is being produced from the step counter 98 during a period T3, the analog switch 80-1 or 80-3 is closed in response to the output signal from the polarity detector 90. Namely, while a high-level signal is being produced from the polarity detector 90, the AND gate 104 is enabled to close the analog switch 80-1, so that the voltage V3 is applied to the integrator 84. While a low-level signal is being produced from the polarity detector 90, on the other hand, the AND gate 106 is enabled to close the analog switch 80-3, so that a voltage $-V3$ is applied to the integrator 84. Accordingly, the integrated output signal of the integrator 84 gradually varies toward the zero level during the period T3. When the zero level detector 92 detects that the integrated output signal has reached the zero level, a pulse is supplied to the latch circuit 100 via the AND gate 102. In response to the pulse from the zero level detector 92, the latch circuit 100 stores the current count value in the main counter 96.

Assume that the main counter 96 has counted "0", "10,000" and "20,000" at times t1, t2 and t3, respectively, and that the integrated output signal of the integrator 84 has reached the zero level at a time t4. Then, if the resistance of the resistor 85, capacitance of the capacitor 84-2, and the period between the times t3 and t4 are R9, C1 and T4, respectively integrated output signals V7 and V8 of the integrator 84 during the periods T2 and T4 are given respectively by the following equations:

$$V7 = -\frac{1}{C1} \int_{t2}^{t3} \frac{V6}{R9} dt \quad (7)$$

$$V8 = -\frac{1}{C1} \int_{t3}^{t4} \frac{-V3}{R9} dt \quad (8)$$

Since the integrated output voltage of the integrator 84 is 0 at the time t4, the following equation is obtained from eqs. (7) and (8):

$$-\frac{1}{C1} \int_{t2}^{t3} \frac{V6}{R9} dt + \frac{1}{C1} \int_{t3}^{t4} \frac{-V3}{R9} dt = 0 \quad (9)$$

Here the period T2 can previously be set, so that the period T3 may be given by $$T3 = \frac{V6}{V3} \cdot T2 \quad (10)$$

As is evident from eqs. (7) and (8), if the absolute value $|-V1|$ of the output voltage of the load cell 2 is lower or higher than the zero point setting voltage V4, the integrated output signal of the integrator 84 varies as shown in FIG. 2 or 3, respectively.

Count value N counted by the counter 96 during the period T3 is given as follows:

$$N = 10000 \times \frac{T3}{T2} = 10000 \times V3 \quad (11)$$

Substituting eqs. (1), (3) and (6) into eq. (11) gives the following equation:

$$N = 10000 \times \frac{1}{\frac{R2}{R1} \cdot \frac{R4 + VR4}{R3 + R4 + VR3 + VR4}} \cdot V_E \times \left(1 + \frac{R7}{R8}\right) \quad (12)$$

$$\left(-\frac{F}{F_N} \cdot K + \frac{R6 + VR6}{R5 + R6 + VR5 + VR6} \cdot \frac{R2}{R1} \cdot \frac{R4 + VR4}{R3 + R4 + VR3 + VR4}\right) V_E$$

$$= 10000 \times \frac{\left(1 + \frac{R7}{R8}\right)\left(-\frac{K}{F_N}\right)}{\frac{R2}{R1} \cdot \frac{R4 + VR4}{R3 + R4 + VR3 + VR4}} \cdot F + 10000 \times \left(1 + \frac{R7}{R8}\right) \frac{R6 + VR6}{R5 + R6 + VR5 + VR6}$$

Accordingly, the relationship between the count output N and weight of load F may be obtained as shown in FIG. 3. In FIG. 3, points $N_P$ and $N_Q$ represent count outputs of the main counter 96 when the weight of load F is 0 and at the maximum rated weight, respectively. Here it should be noted that the value 0 for the weight of load F suggests that no load is put on a scale (not shown) of the electronic weight measuring device, and that the load cell 2 actually is subjected to the weight of the scale and other factors. Although the output voltage of the load cell 2 is not 0 where F=0, it is made 0 by e.g. incorporating a compensating resistor in the load cell 2 or externally applying a compensating voltage to the load cell.

Based on the count output signal from the main counter and the polarity indicating signal from the polarity detector 90, the microprocessor 8 calculates the weight of load and displays the result of such calculation on the display unit 10.

As may be seen from eq. (12), the count value $N_P$ with F=0 will never change even if the inclination of a straight line given by eq. (12) is varied by the potentiometer 52 of the sensitivity regulator circuit 14 to change the resistances VR3 and VR4. That is, if the resistances VR3 and VR4 are changed by adjusting the potentiometer 52 of the sensitivity regulator circuit 14, the output voltage of the zero point setting circuit 16 is also changed according to the degree of variation in the resistances VR3 and VR4. Thus, the output voltage of the zero point setting circuit 16 is varied always in accordance with the sensitivity of the A/D converter 6. Suppose, for example, the output voltage of the zero point setting circuit 16 is so adjusted that the count output $N_P$ is 20,000 when F=0, and then the count output $N_Q$ becomes −19,900 when $F = F_N$ is obtained. In this case, the count output $N_P$ with F=0 will remain substantially 20,000 even if the output voltage of the sensitivity regulator circuit 14 is adjusted to set the count output $N_Q$ to −20,000. Thus, it will be easy to set the difference between the count output $N_P$ obtained with F=0 and the count output $N_Q$ obtained with $F = F_N$ to 40,000.

According to this invention, as described above, the output voltage of the zero point setting circuit 16 may be changed to adjust the reference voltage of the load cell 2 by adjusting the sensitivity regulator circuit 14, so that the no-load output voltage may be kept substantially constant.

What is claimed is:

1. An electronic weight measuring device comprising:
   a power source (E) having first and second power source terminals;
   a reference power source terminal;
   a load cell (2) coupled between said first and second power source terminals for producing between first and second output terminals an output voltage signal corresponding to a weight of load within a given weight measuring range;
   a voltage generating circuit (12) coupled between said first and second power source terminals for generating an output voltage between the output terminal thereof and said reference power source terminal, the output voltage of said voltage generating circuit (12) being varied according to a voltage applied between said first and second power source terminals;
   first bias means including a first potentiometer (52) having a movable terminal and two terminals respectively coupled to said reference power source terminal and to an output terminal of said voltage generating circuit;
   second bias means including a second potentiometer (64) having two terminals respectively coupled to the movable terminal of said first potentiometer and said reference power source terminal, and a movable terminal coupled to the first output terminal of said load cell;

a signal processor circuit coupled to the second output terminal of said load cell and to the movable terminal of said first potentiometer and producing in response to an output signal from said first bias means an output signal corresponding to the output signal from said load cell within a range corresponding to said given weight measuring range and defined by positive and negative values;

analog-digital converter means coupled to said signal processor circuit to convert the output signal from said signal processor circuit into a digital signal; and a digital processor unit coupled to said analog-digital converter means to produce an output signal representing a weight to be measured in response to an output signal from said analog-digital converter means.

2. An electronic weight measuring device according to claim 1, further comprising an amplifier circuit coupled between the second output terminal of said load cell and said signal processor circuit.

3. An electronic weight measuring device according to claim 1, wherein said reference power source terminal is at ground potential.

4. An electronic weight measuring device according to claim 1, 2 or 3, wherein said load cell comprises a resistance-type bridge circuit having resistors whose resistances vary with distortion force applied thereto.

5. An electronic weight measuring device according to claim 1, 2 or 3, wherein said first bias means is adjustable to cause said signal processor circuit to produce an output signal of substantially 0 volts when half the maximum weight in said weight measuring range is applied to said load cell.

6. An electronic weight measuring device according to claim 1, 2 or 3, wherein said second bias means is adjustable to cause said load cell to produce an output signal of substantially 0 volts when no load is applied to said load cell.

7. An electronic weight measuring device according to claim 1, 2 or 3, wherein said analog-digital converter means includes an integration circuit for integrating an output signal from said signal processing circuit, a level detector coupled to said integration circuit producing an output signal when detecting that an output signal from said integration circuit has reached a preset level, and a count generating circuit coupled to said level detector for producing in response to an output signal from the level detector a count signal corresponding to the timing at which said level detector has produced an output signal.

8. An electronic weight measuring device according to claim 1, 2 or 3, further comprising a display device coupled to said digital processor unit to display weight data corresponding to an output signal from said digital processor unit.

9. An electronic weight measuring device according to claim 1, 2 or 3, wherein said signal processor circuit comprises an adding circuit for adding an output signal from said first bias means and a signal corresponding to an output signal from said load cell.

10. An electronic weight measuring device according to claim 9, wherein said signal processor circuit includes a capacitor, first and second switches coupled between the movable terminal of said first potentiometer and both ends of said capacitor, respectively, and third and fourth switches coupled between said reference power source terminal and both ends of said capacitor, respectively.

11. An electronic weight measuring device according to claim 9, wherein said analog-digital converter means includes an integration circuit for integrating an output signal from said signal processing circuit, a level detector coupled to said integration circuit for producing an output signal when detecting that an output signal from said integration circuit has reached a preset level, and a count generating circuit coupled to said level detector for producing in response to an output signal from the level detector a count signal corresponding to the timing at which said level detector has produced an output signal.

* * * * *